United States Patent Office 2,718,506
Patented Sept. 20, 1955

2,718,506

ELECTRICALLY CONDUCTING COATING COMPOSITIONS CONTAINING A NONOXIDIZED MAGNETIC METAL POWDER

Albert J. Elleman, London, England, assignor to Imperial Chemical Industries Limited, a corporation of Great Britain No Drawing. Application July 31, 1951,
Serial No. 239,625

Claims priority, application Great Britain August 22, 1950

4 Claims. (Cl. 252—513)

This invention relates to coating compositions which will give electrically-conducting films with improved protective qualities.

The desirability of having a liquid coating composition which when applied to a surface will form a hard, protective and electrically-conducting film has long been recognised. The difficulty in producing such coating compositions arises from the fact that the most suitable binding or film-forming ingredients are oleoresinous in nature and are electrically-insulating. Various attempts have been made to overcome the electrical resistivity of oleoresinous films by incorporating in the coating composition a conductive powder such as zinc, copper, silver or carbon black. In order to impart a reasonable degree of electrical conductivity to the film the conductive particles must be in contact with each other to form conductive paths or chains through the film and if the above-mentioned electrically-conducting materials are used the high proportions of powder required to ensure contact between adjacent particles adversely affects the protective qualities, e. g. water-resistance and durability, of the film. Furthermore the particles of non-conductive material used to impart colour or anticorrosive properties to the film affect the continuity of the conductive chains, and if a film of relatively high electrical-conductivity is required this non-conductive material cannot be incorporated in the composition.

We have now found that if the electrically-conducting powder also possesses magnetic properties then the proportion of powder required to impart electrical-conductivity to the film is much less than in the case of non-magnetic powders. As a result it is now possible to provide coating compositions which give electrically-conducting, durable and protective films and in which most of the usual pigments and anti-corrosive materials may be incorporated. The present invention therefore provides an electrically-conducting coating composition containing substantially non-oxidised magnetic metal powder in a proportion of from 5–25% by volume of the solids.

Any type of magnetic metal may be used but since a film of oxide on the particles will reduce the electrical conductivity of the chains the non-oxidising metals are generally more useful, though of course, in the case of oxidisable metals any oxide film on the particles may be removed before incorporating the powder in the paint.

It is believed that the improved effectiveness of magnetic metal powders is due to the fact that their inherent magnetic properties cause the particles to attract each other and to link up to form conductive chains in the paint film. This magnetic arrangement of the particles will result in a greater number of conductive chains than a haphazard arrangement of the same proportion of non-magnetic particles. Chain formation will depend on, amongst other things, the strength of the magnetic attraction between the particles and it has been found that, presumably for this reason, metal powders possessing magnetic remanence give better results than those possessing zero remanence. Further, with a given proportion of metal powder the number and length of the chains will depend on the shape of the metal particles and we have found the lower the apparent density of the powder the more useful it is in the present invention.

The advantage to be derived from the invention may be illustrated as follows:

A standard zinc chromate anticorrosive primer was modified by the addition of:

( i) Zinc powder
( ii) Brass powder
(iii) Stainless powder
(iv) Soft iron powder
( v) Nickel powder the proportion of metal powder being in each case 13.8% by volume of the solids of the primer. The powder was thoroughly stirred into the primer, metal panels were coated with it and the electrical resistance of the dried film was measured between electrodes $3/16''$ in diameter. The results were:

Table I

| Film Composition | Film resistance, milliohms/thou. |
|---|---|
| Unmodified primer | >50,000 |
| Primer + zinc | 25,000 |
| Primer + brass | 25,000 |
| Primer + stainless steel | 30,000 |
| Primer + soft iron | 3,000 |
| Primer + nickel | 30 |

The resistances of the paint films containing the magnetic metals soft iron and nickel are very much lower than those of the paint film containing the non-magnetic metals zinc, brass and stainless steel. In order to obtain a film resistance of 30 milliohms/thou. using powdered zinc it would be necessary to use it in a proportion of the order of 66% or even 75% of the solids and such a composition would be underbound and unsatisfactory as a protective finish. The difference between the soft iron and nickel figures may be due to the presence on the soft iron particles of a thin layer of oxide. That this will affect the conductivity of a chain of the particles may be shown by measuring the resistance of the powders after being compacted under pressure in tubes. Whereas the resistances of soft iron and nickel in bulk are almost identical, the compacted iron powder had a resistance of 1500 ohms/cm.$^3$ and the compacted nickel powder had a resistance of 0.03 ohm/cm.$^3$. The conductivity of a paint film containing soft iron powder may be increased by reducing any oxide film on the powder before incorporating it in the paint. Other magnetic metals suitable for the pupose of this invention are magnetic steels and alloys such as Permalloy and Alnico.

Mere stirring in of the metal powder, although giving a useful indication of the properties of the composition, is not sufficient to produce a satisfactory paint or lacquer since the powder is inadequately dispersed. Large aggregates remain and since these affect the can stability of the composition and give rise to roughness in the paint film it is necessary to ball-mill or otherwise thoroughly disperse the powder in the paint. We have found that although thorough dispersion of the powder in the paint results in a decrease in the conductivity of the paint film, the conductivity of the film may be increased, in some cases very markedly, by subjecting the liquid paint in bulk form to a magnetic field. The effect on the electrical resistance of the film of applying a magnetic field to the liquid paint is shown in Table II.

*Table II*

| Percent vol. nickel in dry film | Film resistance after application of magnetic field of— | | | |
|---|---|---|---|---|
| | 0 gauss | 75 gauss | 148 gauss | 271 gauss |
| 25.0 | 9 | 4 | 2 | 2 |
| 20.0 | 11 | 5 | 2.5 | 2 |
| 15.0 | 30 | 13 | 4 | 2 |
| 10.0 | 130 | 23 | 7 | 4 |
| 7.5 | 154 | 32 | 18 | 15 |
| 5.0 | 182 | 161 | 60 | 91 |

The resistances of the films are expressed in milli-ohms/thou.

The improvement is most marked with metals such as nickel which possess the property of magnetic remanence and in general it has been found that the higher the degree of magnetic remanence the more suitable is the metal powder for the purpose of this invention. However even magnetic metals with zero remanence give films much more conductive than those containing a non-magnetic metal. For example a paint film containing a nickel-iron alloy of zero remanence had an electrical resistivity of 2,500 milli-ohms/thou., i. e. only one tenth of the resistance of a similar paint film containing zinc powder.

The conductivity is also influenced by the size and shape of the particles of the powdered metal and we have found that the lower the apparent density of the powder, the lower is the electrical resistivity of the paint film.

The apparent density of the powders was determined by placing a sample in a graduated tube and centrifuging for five minutes at 780 g., the weight of the sample and its apparent volume then being measured. The effect of this factor is illustrated in Table III.

*Table III*

| Apparent density nickel powder | Coating Composition I | | Coating Composition II | | Coating Composition III | |
|---|---|---|---|---|---|---|
| | Vol. Percent Ni in dry film | Milli-ohms/thou. | Vol. Percent Ni in dry film | Milli-ohms/thou. | Vol. Percent Ni in dry film | Milli-ohms/thou. |
| 2.70 | 15.0 | 38 | 15.0 | 200 | 17.5 | 27 |
| 1.92 | 15.0 | 20 | 15.0 | 53 | 17.5 | 15 |
| 1.17 | 15.0 | 8 | 15.0 | 11 | 17.5 | 3 |
| 0.86 | 15.0 | 6 | 15.0 | 5 | 17.5 | 2.5 |

The electrical resistance of the film was determined by coating a metal panel and measuring the resistance between two 3/16" diameter electrodes pressed one on each side of the coated panel with a total pressure of 300 lbs. Coating composition I contained, as solids, nickel powder and oil-modified alkyd resin and compositions II and III contained in addition carbon black and Paris white. The volume percentage of nickel in the dry film was calculated on the real density 8.9 of nickel and in general we have found that for the purpose of this invention magnetic metal powders with a ratio of real density to apparent density (as measured above) of greater than 4:1 give better results.

The effect of varying the proportion of magnetic metal powder also is illustrated in Table II. It would appear that increasing the proportion of nickel above 25% by volume will have little effect on the resistance of the film and that below 5% the effect on the resistance of the film is erratic or non-uniform. In a preferred form of our invention therefore the magnetic metal is used in a proportion of from 5 to 25% by volume of the solids of the coating composition.

The presence of most of the usual pigments such as titanium dioxide and carbon black or fillers and extenders such as Paris white and China clay or anticorrosive materials such as zinc chromate does not seriously reduce the conductiveness of paint films containing magnetic metal powder, the exceptions being non-conducting magnetic materials such as certain iron oxides. Such magnetic oxides have an adverse effect on the conductivity probably due to their becoming incorporated into the chains and forming non-conducting links.

What we claim is:

1. An electrically-conducting protective coating composition containing metal powder in a proportion of from 5 to 25% by volume of the solid content of the coating composition, said metal powder consisting essentially of non-oxidized magnetic metal powder possessing magnetic remanence, said composition having been subjected to a magnetic field in bulk form while in liquid condition.

2. A composition as recited in claim 1 in which the coating composition contains an oil-modified alkyd resin binder.

3. A composition as recited in claim 1 in which the powdered metal is nickel.

4. An electrically-conducting protective coating composition containing metal powder in a proportion of from 5 to 25% by volume of the solid content of the coating composition, said metal powder consisting essentially of non-oxidized magnetic metal powder possessing magnetic remanence, the ratio of real density to apparent density of said metal powder being in excess of 4:1.

References Cited in the file of this patent

UNITED STATES PATENTS

| 2,280,135 | Ward | Apr. 21, 1942 |
| 2,570,856 | Pratt et al. | Oct. 9, 1951 |